United States Patent
Williams

[15] 3,658,248
[45] Apr. 25, 1972

[54] AUTOMATIC PIPELINE STRAIGHTENER AND SPRINKLER HEAD LEVELER FOR SPRINKLER IRRIGATION SYSTEMS

[72] Inventor: Leonard H. Williams, Hermiston, Oreg.
[22] Filed: Dec. 18, 1970
[21] Appl. No.: 99,624

[52] U.S. Cl. .............................239/73, 239/111, 239/212, 116/34 B, 137/344, 305/19, 152/16
[51] Int. Cl. .......................................................B05b 3/18
[58] Field of Search.................239/71, 73, 74, 110, 111, 177, 239/212; 137/344; 116/34 B, 132, 118; 301/41; 305/19; 152/13, 14, 16

[56] References Cited

UNITED STATES PATENTS

| 1,989,321 | 1/1935 | Laize | 152/16 |
| 2,527,119 | 10/1950 | Dauber et al. | 239/71 X |

Primary Examiner—M. Henson Wood, Jr.
Assistant Examiner—Michael Y. Mar
Attorney—Oliver D. Olson

[57] ABSTRACT

In a sprinkler irrigation system in which an elongated pipeline is supported above ground on longitudinally spaced wheels and sprinkler heads are mounted on the pipeline also at longitudinally spaced intervals, each of at least some of the wheels is provided with a separate arcuate rim segment aligned vertically with the sprinkler heads and capable of being collapsed under the weight of water in the pipeline.

5 Claims, 5 Drawing Figures

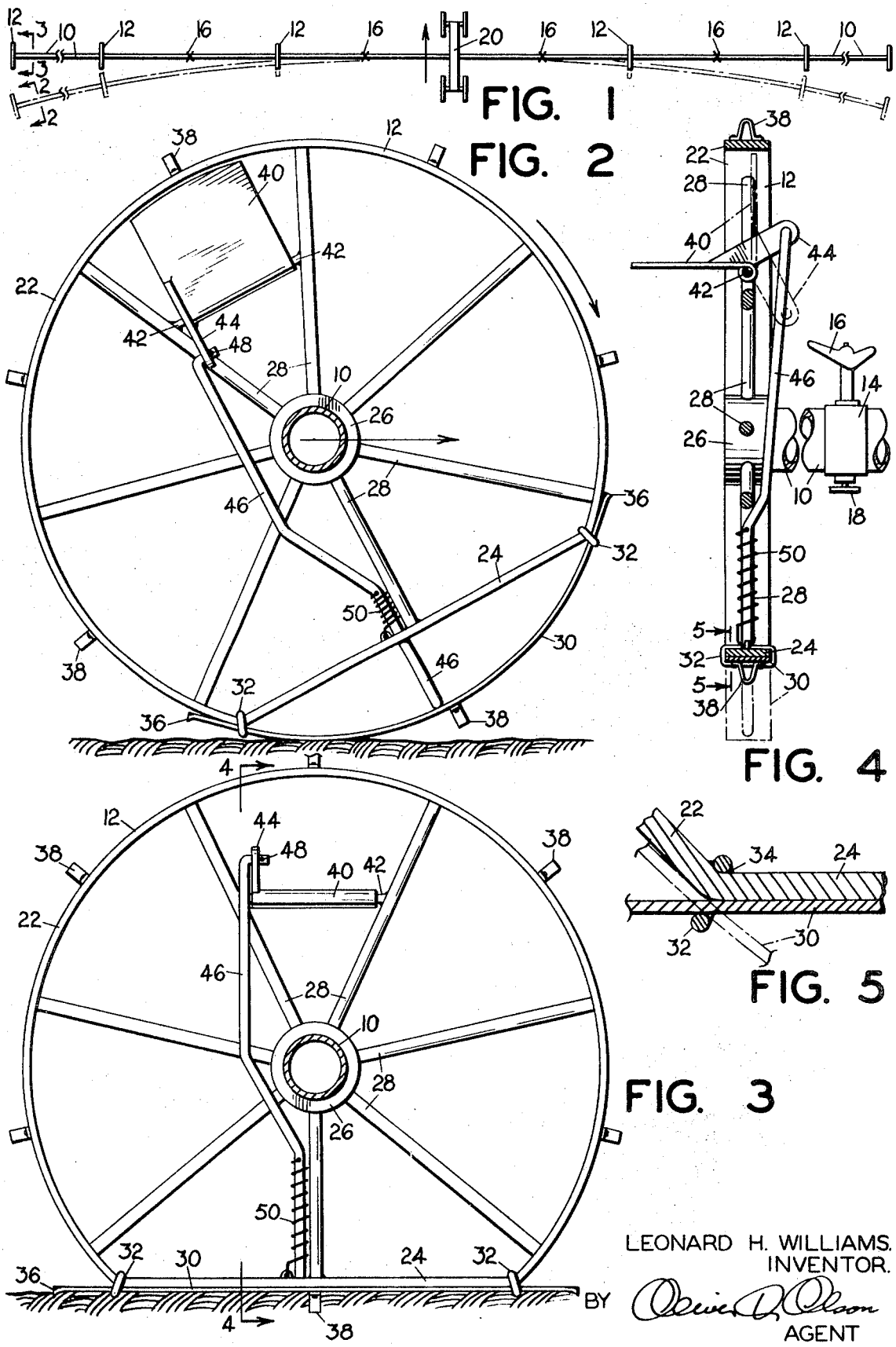

3,658,248

AUTOMATIC PIPELINE STRAIGHTENER AND SPRINKLER HEAD LEVELER FOR SPRINKLER IRRIGATION SYSTEMS

BACKGROUND OF THE INVENTION

This invention relates to sprinkler systems, and more particularly to novel means for automatically maintaining the pipeline of such system straight and the sprinkler heads thereof level, i.e. with their rotational axes vertical.

There are many types of sprinkler irrigation systems presently in use for supplying water to crops. One such type which is in wide spread use comprises an elongated irrigation pipe supported above ground by a plurality of longitudinally spaced wheels and mounting a plurality of longitudinally spaced sprinkler heads. Each of the pipeline fittings which mounts a sprinkler head usually also mounts a drain valve which opens automatically when the water supply is shut off. This automatic drain is provided primarily to lighten and thus facilitate moving of the assembly.

The pipeline is made up of a plurality of interconnected sections and most often exceeds several hundred feet in length. A typical pipeline is about one quarter mile in length.

Intermediate the ends of the pipe is a power-driven wheeled unit which facilitates moving the assembly to various positions. The wheeled unit is connected to the pipe to cause rotation of the latter and the wheels upon which it is supported. However, because of the extreme length of the pipeline, for example one-eighth mile from the power-driven unit to the opposite ends, the pipe tends to twist on its longitudinal axis so that the ends of the pipe lag behind the central portion as the assembly is moved.

The foregoing twisting of the pipe and lagging of the outer ends thereof presents two primary problems: First, the twisting of the pipe progressively toward the ends thereof results in the sprinkler heads being tilted from level to progressively increased magnitudes toward the ends of the pipe. The spray pattern of water delivered from the sprinkler heads thus also is progressively tilted, resulting in uneven sprinkling of the ground.

Counterweight means has been provided heretofore by which to mount the sprinkler heads on the pipeline fittings, to maintain the sprinkler heads level regardless of the axial twist of the pipeline. Such counterweight means overcomes the problem of uneven water distribution. However, it does not overcome a serious problem associated with the operation of the automatic drain. Incorporated with the drain valve is a baffle which, when the valve is disposed vertically, diverts the draining water in a circular pattern. This distributes the draining water over a substantial area of the ground and thus prevents local errosion and puddling. However, the drain valve is associated with the pipeline fitting and thus becomes tilted to the same degree as the pipeline becomes twisted. Corresponding tilting of the baffle destroys its function, whereupon the draining water falls to the ground in a concentrated stream. This causes local errosion of the soil and puddling.

Second, lagging of the opposite ends of the pipeline relative to the intermediate, driven portion disturbs the straight line arrangement of the irrigation pattern. The lagging ends also cause an overlapping of irrigation water onto a previously irrigated area.

In order to overcome the problems associated with twisting of the pipe and lagging of the opposite ends of the pipeline, it has been the general practice heretofore for the operator to walk from the central location of the power-driven unit to the opposite ends of the pipeline and to physically rotate the end supporting wheels in the direction to straighten the pipeline and level the sprinkler heads. Although the operator must walk to one end of the pipeline in order to couple it to the water supply, the walk to the opposite end of the pipeline represents an unnecessary effort to the operator and a loss of irrigation time. In this regard, it has been determined that, with a pipeline of one-quarter mile length, this loss of time contributes to the loss of irrigation of eight acres in 24 days of irrigation.

SUMMARY OF THE INVENTION

In its basic concept the automatic pipeline straightener and sprinkler head leveler of this invention involves the provision of a pipeline supporting wheel having a separate arcuate rim segment aligned vertically with the sprinkler heads and capable of being collapsed under the weight of water in the pipeline.

It is by virtue of the foregoing basic concept that the principal objective of this invention is achieved; namely, to overcome the aforementioned disadvantages associated with prior sprinkler irrigation systems.

Another important object of this invention is the provision of automatic means of the class described in which is incorporated a visible signal movable with the separate arcuate rim segment to give visible indication to the operator whether the pipeline is filled with or drained of water.

Another important object of this invention is the provision of automatic means of the class described which is of simplified construction for economical manufacture and which is capable of use with commercially available sprinkler irrigation systems of the wheel-supported type.

The foregoing and other objects and advantages of this invention will appear from the following detailed description, taken in connection with the accompanying drawing of a preferred embodiment.

BRIEF DESCRIPTION OF THE DRAWING

FIG. 1 is a foreshortened plan view of a sprinkler irrigation system incorporating an automatic pipeline straightener and sprinkler head leveler embodying the features of this invention, the system being shown in broken lines in a twisted and unstraightened condition and in full lines in the corrected, untwisted and straightened condition.

FIG. 2 is a sectional view taken on the line 2—2 in FIG. 1, the components of the mechanism being shown in a preliminary, twisted condition of the water pipeline, as illustrated in broken lines in FIG. 1.

FIG. 3 is a sectional view taken on the line 3—3 in FIG. 1 showing the components in pipeline straightening and sprinkler head leveling position.

FIG. 4 is a fragmentary, foreshortened sectional view taken on the line 4—4 in FIG. 3.

FIG. 5 is a fragmentary sectional view taken on the line 5—5 in FIG. 4.

DESCRIPTION OF THE PREFERRED EMBODIMENT

For purposes of illustration there is shown in FIG. 1 of the drawing the aforementioned conventional type of sprinkler irrigation system which includes an elongated pipeline 10 supported above ground on longitudinally spaced wheels 12. The pipeline is made up of a plurality of sections interconnected by coupling members 14 each of which includes a fitting (FIG. 4) for a rotary sprinkler head 16 and an automatic drain 18. Intermediate the ends of the pipeline there is provided a power-driven wheeled unit 20, as previously explained.

Generally, the lengths of pipe and their couplings are made of light-weight aluminum for easy transport and assembly, and each supporting wheel comprises a circular rim of minimum cross sectional dimensions and a multiplicity of wire type spokes, to minimize weight. Further, preliminary to moving the assembly by the power-driven wheeled unit, the source of water under pressure is shut off and the drain valves opened automatically to drain the system of water, further to minimize weight.

In accordance with the present invention a specially constructed pipeline supporting wheel, illustrated in FIGS. 2–5 of the drawing, is substituted for at least one of the conventional wheels adjacent the end of the pipeline opposite the end which connects with the source of water under pressure. It will be understood that all of the conventional wheels may be replaced by the special wheels described hereinafter, if desired.

The special wheel of this invention includes a major wheel portion comprising a flat peripheral rim 22 of minimum cross sectional dimension which defines a major segment of a circle. The terminal ends of this rim are interconnected by a chord brace 24. The circular segment portion of the rim is disposed concentrically about a mounting hub 26, and the rim and chord brace are secured to the hub by means of circumferentially spaced radial spokes 28.

The hub 26 is adapted to be secured to a pipeline, as by set screws, with the chord brace 24 disposed perpendicular to the vertical axis of rotation of the sprinkler heads 16.

The circle of the wheel is completed by a minor wheel portion comprising a separate arcuate rim segment 30 of resilient material such as thin sheet steel. The opposite ends of the separate segment overlap the adjacent end portions of the rim 22 and extend slidably through guide members 32. The guide members are secured to the wheel rim 22 adjacent the chord brace 24, as by welding 34. The terminal ends of the resilient segment are bent outward or otherwise provided with offset abutments 36 by which to prevent disengagement from the guide members.

Ground-engaging lugs 38 may be provided on the wheel rim portions 22 and 30, as desired.

The arcuate rim member 30 is chosen to provide a resilient resistance to deflection such that when the pipeline is drained of water the arcuate segment completes the circle of the supporting wheel, as illustrated in FIG. 2, but when the pipeline is filled with water the arcuate segment is collapsed against the chord brace, as illustrated in FIG. 3.

Thus, with the pipeline 10 drained of water, preliminary to moving the sprinkler irrigation assembly, the power-driven unit 20 is activated to move the assembly, for example upward in the direction of the arrow in FIG. 1, from an area just irrigated to the next area to be irrigated. Since the arcuate rim segments 30 complete the circles of the supporting wheels, the latter are moved with minimum resistance over the wet, previously irrigated ground.

However, as explained hereinbefore, the axial twisting of the pipeline results in a lag in rotation of the wheels progressively outward of the power-driven unit 20. Thus, for example, the wheel at the outer end of the pipeline may lag the rotation at the center of the pipeline by as much as 30°, as illustrated in FIG. 2. In this position of axial twist of the pipeline, the outermost wheel engages the dry, unirrigated ground adjacent one end of the arcuate resilient rim segment 30. Then, when water is filled into the pipeline the additional weight thereof overcomes the resilient resistance of the arcuate rim segment 30 and causes the latter to collapse toward the chord brace 24. The wheel thereupon rotates, clockwise as indicated by the arcuate arrow in FIG. 2, to the position illustrated in FIG. 3 wherein the resilient segment is collapsed against the chord brace. In this position the wheel has rotated to untwist the pipeline and has moved the pipeline forward, toward the right as indicated by the horizontal arrow in FIG. 2. Accordingly, all of the sprinkler heads 16 are leveled and the end of the pipeline 10 has been moved the same distance as the central portion thereof.

In the preferred embodiment illustrated, signal means also is provided for giving visible indication to the operator, at his station adjacent the power-driven unit 20, whether the pipeline 10 is filled with or emptied of water. Thus, a brightly colored flag 40 is pivoted at one end to a transverse shaft 42 extending between adjacent spokes 28 of the major wheel portion. An arm 44 projects from the flag and is provided with an aperture which pivotally receives the upper end of an actuating rod 46. A cotter pin 48 extends through a transverse opening in the project end of the rod to secure the latter against retraction from the arm 44.

The intermediate portion of the rod 46 is offset laterally and longitudinally with respect to the wheel in order to bypass the hub 26 and spokes 28. The lower end portion of the rod extends slidably through a guide opening in the chord brace 24 and abuts at its lowermost end against the inner side of the resilient arcuate rim segment 30. A coil spring 50 encircles the lower portion of the rod above the chord brace and is secured at its upper end to the rod and at its lower end to the chord brace. The spring thus urges the actuating rod resiliently downward toward the rim segment 30.

In the position shown in FIG. 2, with the arcuate rim segment 30 extended to complete the circle of the supporting wheel, the flag 40 is elevated to give visible indication to the operator that the pipeline 10 is emptied of water. On the other hand, when the pipeline is filled with water, resulting in the collapse of the arcuate rim segment (FIG. 3) the actuating rod 46 is pushed upward against the resistance of the coil spring 50, thereby pivoting the flag 40 to horizontal position. The absence of the upstanding flag thus indicates to the operator that the pipeline 10 is full of water.

By means of the foregoing flag arrangement, the operator is relieved of the necessity to walk the pipeline to make sure that the latter is emptied of water before moving the assembly to a new location. In this regard it will be recognized by those skilled in the art that serious damage to the pipeline would result if attempt were made to move it before draining it of water.

As explained hereinbefore, the collapsible wheel of this invention may replace one or all of the conventional pipeline supporting wheels of a sprinkler irrigation system. The more that are used the more positive is the straightening of the pipeline and leveling of the sprinkler heads, as will be understood. The signal flag arrangement need only be used on the wheel at the end of the pipeline opposite the end, for example the right hand end in FIG. 1, which is to be connected to the source of water under pressure, since the operator has to walk to that end to make the connection. While at that end the operator may inspect the drain valves to determine when the pipeline is drained of water, and may also rotate the end supporting wheel manually to straighten that end portion of the pipeline.

From the foregoing it will be appreciated that the present invention provides simplified and economical means by which to effect automatic pipeline straightening and sprinkler head leveling of a sprinkler irrigation system. It may be used with conventional pipes of sprinkler irrigation systems of the wheel-supported type, and it contributes materially to maximum irrigation efficiency with minimum operator effort and time.

It will be apparent to those skilled in the art that various changes may be made in size, shape, number, type and arrangement of parts described hereinbefore without departing from the spirit of this invention.

Having now described my invention and the manner in which it may be used, I claim:

1. In a sprinkler irrigation system wherein an elongated pipeline mounts a plurality of longitudinally spaced sprinkler heads and is adapted to be supported above ground on a plurality of longitudinally spaced wheels, a pipeline support wheel comprising a. a major wheel rim portion defining a major segment of a circle,
   b. a wheel hub connected to the major wheel rim portion concentric therewith and arranged for connection to the pipeline with the chord of the major wheel rim portion disposed perpendicular to the vertical axis of the sprinkler heads,
   c. a minor wheel rim portion of resilient material defining a minor segment of the wheel circle, and
   d. connecting means interengaging the major and minor wheel rim portions for movement of said minor wheel rim portion resiliently toward and away from said chord,
   e. the minor wheel rim portion having a resilient resistance sufficient to support the pipeline when empty of water, whereby to complete the circle of the support wheel, but insufficient to support the pipeline when full of water, whereby to cause collapse of said minor wheel rim portion toward said chord.

2. The pipeline support wheel of claim 1 including a chord brace extending between and secured to the ends of the major wheel rim portions.

3. The pipeline support wheel of claim 1 wherein the connecting means comprises guide means on the major wheel rim portion adjacent the opposite ends of said chord slidably receiving therein the opposite end portions of the minor wheel rim portion.

4. The pipeline support wheel of claim 1 including signal means on the wheel movable with the minor wheel rim portion between retracted and signalling positions.

5. The pipeline support wheel of claim 4 wherein the signal means comprises
  a. a flag member mounted pivotally on the major wheel portion,
  b. an actuating rod connected at one end pivotally to the flag member and engaging the minor wheel rim portion at its opposite end, and
  c. resilient means interengaging the actuating rod and major wheel portion urging the rod toward the minor wheel rim portion.

* * * * *